United States Patent
Nakajima

(10) Patent No.: US 11,041,472 B2
(45) Date of Patent: Jun. 22, 2021

(54) MOTOR DRIVING DEVICE

(71) Applicants: FUTABA CORPORATION, Mobara (JP); O.S. ENGINES MFG. CO., LTD., Osaka (JP)

(72) Inventor: Motoi Nakajima, Osaka (JP)

(73) Assignees: FUTABA CORPORATION, Mobara (JP); O.S. ENGINES MFG. CO., LTD., Osaka (JP)

( * ) Notice: Subject to any disclaimer, the term of this patent is extended or adjusted under 35 U.S.C. 154(b) by 0 days.

(21) Appl. No.: 16/776,661

(22) Filed: Jan. 30, 2020

(65) Prior Publication Data
US 2020/0256302 A1    Aug. 13, 2020

(30) Foreign Application Priority Data
Feb. 7, 2019    (JP) .............................. JP2019-020405

(51) Int. Cl.
| | |
|---|---|
| *F02N 11/04* | (2006.01) |
| *F02N 11/08* | (2006.01) |
| *H02J 7/00* | (2006.01) |
| *H02J 7/14* | (2006.01) |
| *H02P 3/06* | (2006.01) |

(52) U.S. Cl.
CPC ............ *F02N 11/04* (2013.01); *F02N 11/087* (2013.01); *H02J 7/0068* (2013.01); *H02J 7/14* (2013.01); *H02P 3/06* (2013.01); *F02N 2011/0888* (2013.01)

(58) Field of Classification Search
CPC ...... F02N 11/04; F02N 11/087; H02J 7/0068; H02J 7/14; H02P 3/06
See application file for complete search history.

(56) References Cited

U.S. PATENT DOCUMENTS

2017/0305274 A1* 10/2017 Saha .................... H02P 3/24

* cited by examiner

*Primary Examiner* — Viet P Nguyen
(74) *Attorney, Agent, or Firm* — Bacon & Thomas, PLLC

(57) ABSTRACT

A motor driving device is provided. The motor driving device includes a driving unit configured to drive a starter motor/generator that is directly connected to an engine by a rotation shaft, by performing on/off control of switching elements in a bridge circuit for driving a motor; and a driving controller configured to control a driving operation for the starter motor/generator that is performed by the driving unit. The driving unit controls a motor driving voltage for the starter motor/generator by changing ON periods of the switching elements of the bridge circuit, and turns on predetermined switching elements of the bridge circuit at a predetermined timing to perform an active freewheel operation for boosting a regenerative voltage generated by the starter motor/generator. The driving controller instructs the driving unit to control the motor driving voltage and on/off of the active freewheel operation, based on a battery voltage.

6 Claims, 15 Drawing Sheets

FIG.2
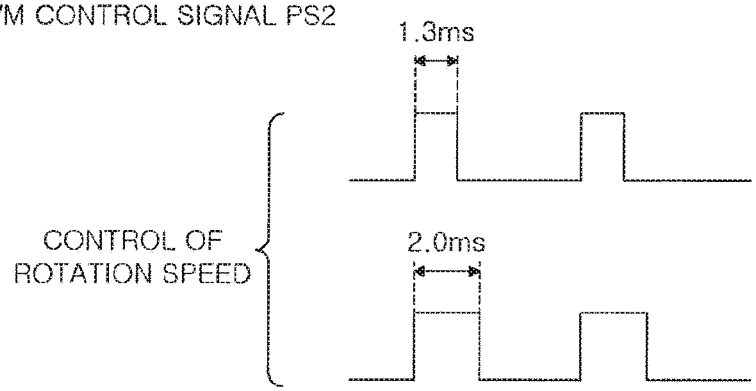
PWM CONTROL SIGNAL PS2
CONTROL OF ROTATION SPEED
- 1.3ms
- 2.0ms
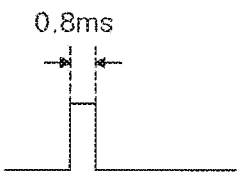
INITIAL SIGNAL — 0.8ms
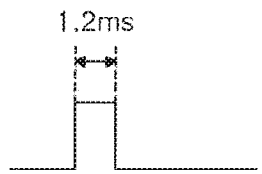
ENGINE START SIGNAL — 1.2ms
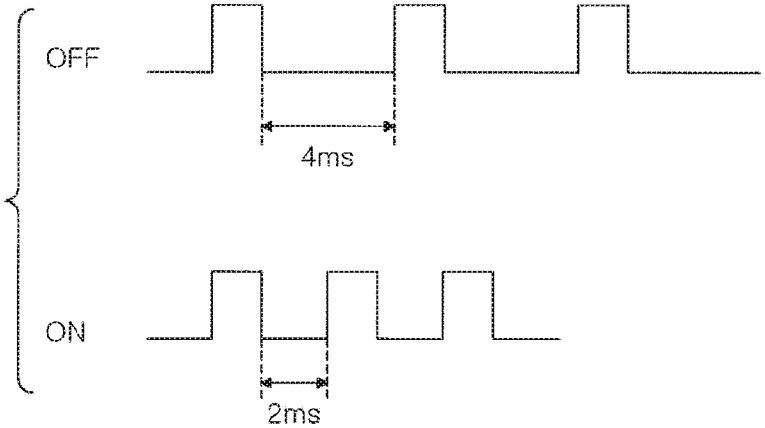
ON/OFF CONTROL OF ACTIVE FREEWHEEL OPERATION
- OFF — 4ms
- ON — 2ms

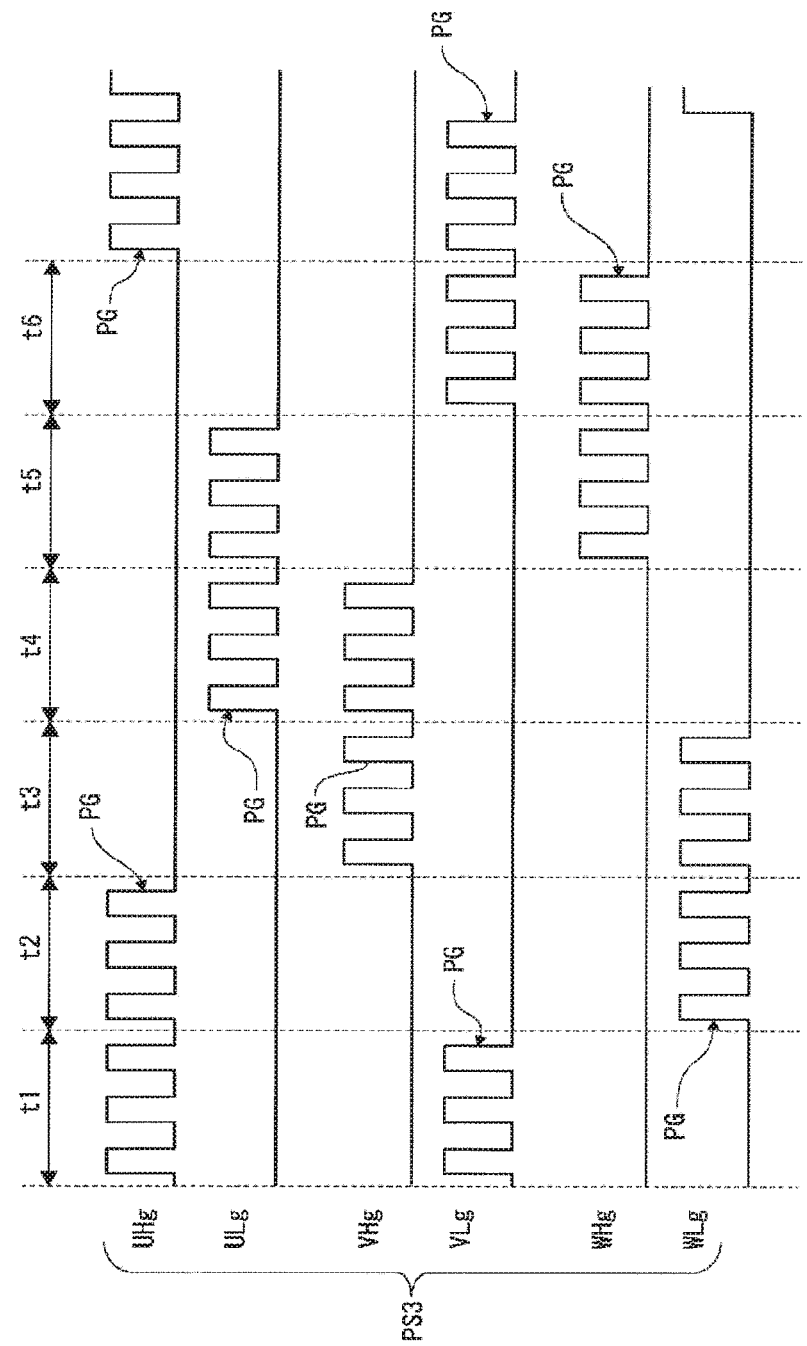

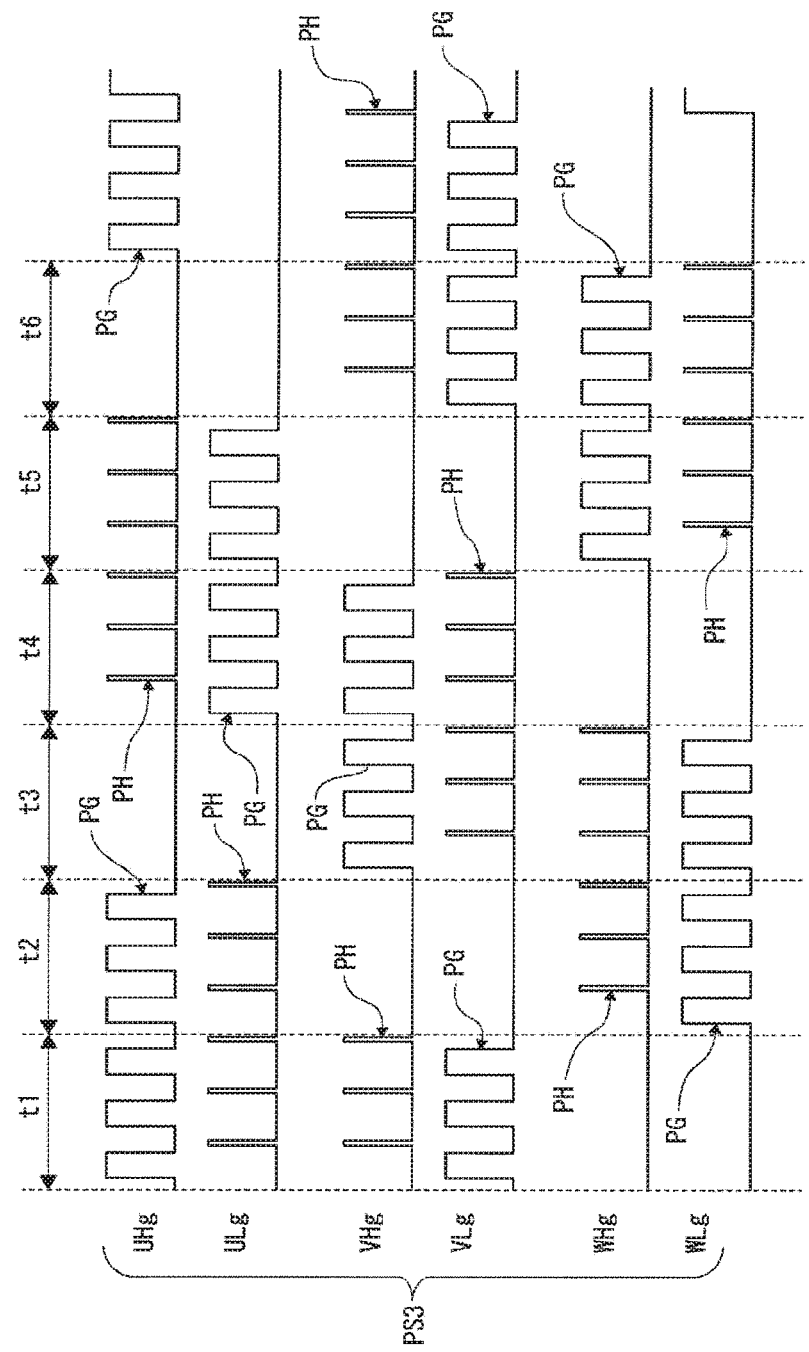

MOTOR DRIVING DEVICE

TECHNICAL FIELD

The present disclosure relates to a motor driving device for driving a starter motor of an engine.

BACKGROUND

In general, a motor is used for driving a load and serves as a generator for generating a regenerative power.

For example, Japanese Patent Application Publication No. 2001-271729 discloses a technique related to a control device for a motor serving as an engine starter and a generator.

When the starter motor for the engine serves as a generator, an additional device(s) is required to charge a regenerative power to a battery or the like. A voltage step-up/step-down circuit or a motor speed increasing mechanism, that is assumed to be the additional device, has a comparatively large scale, which results in an increase in a size, a weight, and a cost of a motor driving device.

In view of the above, the present disclosure suggests a motor driving device capable of accurately controlling a motor/generator without requiring an additional device having a comparatively large scale.

SUMMARY

In accordance with an aspect of the present disclosure, there is provided a motor driving device including: a driving unit configured to drive a starter motor/generator that is directly connected to an engine by a rotation shaft, by performing on/off control of each of switching elements in a bridge circuit for driving a motor; and a driving controller configured to control a driving operation for the starter motor/generator that is performed by the driving unit. The driving unit controls a motor driving voltage for the starter motor/generator by changing ON periods of the switching elements of the bridge circuit, and turns on predetermined switching elements of the bridge circuit at a predetermined timing to perform an active freewheel operation for boosting a regenerative voltage generated by the starter motor/generator. Further, the driving controller is configured to instruct the driving unit to control the motor driving voltage and on/off of the active freewheel operation, based on a battery voltage.

In other words, in the configuration in which the starter motor/generator is directly connected to the engine by the rotation shaft, there can be provided the motor driving device in which the starter motor/generator is adapted to properly provide the starter motor function for the engine and the regenerative power generation function for charging the battery. Here, the control of the motor driving voltage and the boosting of the regenerative voltage are performed by controlling the switching elements of the bridge circuit.

Further, in the motor driving device, the driving controller may be configured to instruct the driving unit to control the motor driving voltage and the on/off of the active freewheel operation, by using one PWM signal.

For example, the control contents may be set based on an H period ("H" indicates the high level of the pulse) or an L period ("L" indicates the low level of the pulse) of the PWM signal.

Further, in the motor driving device, the driving controller may be configured to provide the driving unit with an initial signal and an engine start signal, by using the one PWM signal.

For example, the initial signal and the engine start signal may be further provided to the driving unit based on the H period or the L period of the PWM signal.

Further, in the motor driving device, the driving controller may be configured to instruct the driving unit to perform on/off control of the active freewheel operation, in response to engine rotation information or operation information.

For example, when the rotational speed of the engine is decreased, it may be possible to stop the active freewheel operation, or it may be possible to stop the active freewheel operation in response to a user's operation.

In accordance with the aspect of the present disclosure, it is possible to provide the motor driving device for driving the starter motor/generator, which can be scaled down at a low cost without additionally requiring a step-up/step-down circuit, a motor speed increasing mechanism, or the like.

BRIEF DESCRIPTION OF THE DRAWINGS

The objects and features of the present disclosure will become apparent from the following description of embodiments, given in conjunction with the accompanying drawings, in which:

FIG. 2 explains a PWM control signal according to an embodiment;

FIG. 7 explains a gate voltage waveform according to an embodiment;

FIG. 8 explains a gate voltage waveform in the case of turning on an active freewheel operation according to an embodiment;

DETAILED DESCRIPTION

<Configuration of a Driving System Including a Motor Driving Device>

Hereinafter, a configuration and an operation of an embodiment will be described with reference to the drawings.

It is assumed that a driving system including a motor driving device 1 according to an embodiment is mounted on a moving body, e.g., a radio-controlled flying vehicle (radio-controlled flying drone, a small helicopter or other flying vehicles), a vehicle, or the like.

Figure 1:
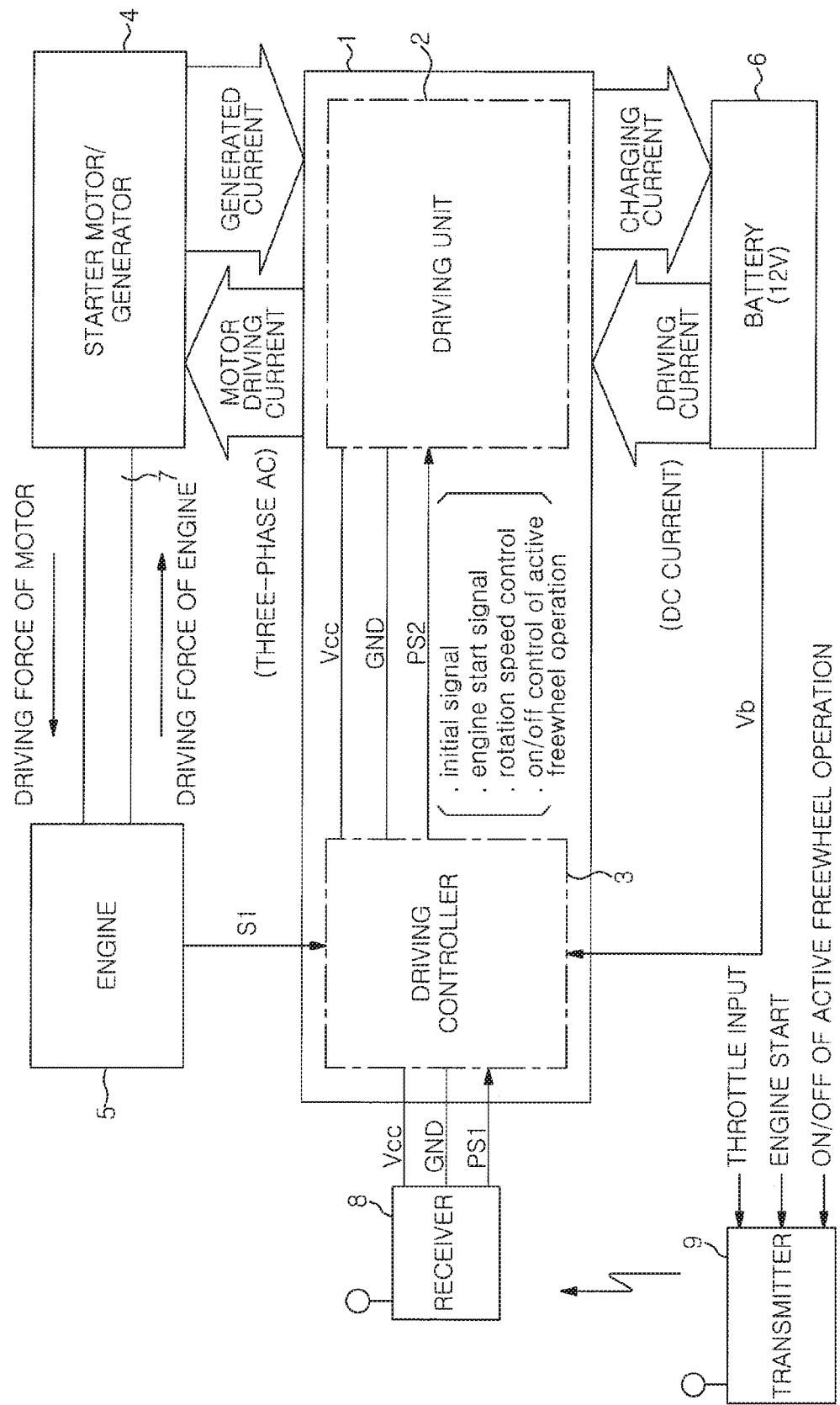
FIG. 1 is a block diagram of a motor driving device and its peripheral parts according to an embodiment.

FIG. 1 shows a configuration example of a driving system that can be employed for a moving body such as a drone or the like. FIG. 1 shows a motor driving device 1, a starter motor/generator 4, an engine 5, a battery 6, a receiver 8, and a transmitter 9.

The starter motor/generator 4 includes, e.g., a brushless motor.

The engine 5 and the starter motor/generator 4 are directly connected by a rotational shaft 7. The starter motor/generator 4 transmits a motor driving force to the engine 5 to function as a starter of the engine 5. Further, the starter motor/generator 4 transmits the motor driving force to the engine 5 as an operation of assisting the engine 5, i.e., a so-called hybrid operation.

The driving force of the engine 5 is transmitted to the starter motor/generator 4 and used for generating a regenerative power. The regenerative power is used for charging the battery 6.

The battery 6 supplies a driving current as a DC current to the motor driving device 1. The motor driving device 1 generates a three-phase AC motor driving current using the driving current and supplies the generated three-phase AC motor driving current to the starter motor/generator 4 to drive the motor.

On the other hand, a current generated by the starter motor/generator 4 is supplied as a charging current to the battery 6 via the motor driving device 1.

The motor driving device 1 shares a starter driving control device and a power generation regulating rectifier with. The motor driving device 1 includes a driving unit 2 and a driving controller 3.

The driving unit 2 generates the three-phase AC motor driving current under the control of the driving controller 3 and drives to rotate the starter motor/generator 4. As will be described later, the driving unit 2 includes a three-phase FET bridge, a gate driver for an FET serving as a switching element of the three-phase FET bridge, or the like, and generates the three-phase motor driving current.

Further, the driving unit 2 can perform an active freewheel operation to be described later by controlling the three-phase FET bridge to increase a regenerative voltage.

The driving controller 3 includes, e.g., a microcomputer, and controls the driving unit 2 in response to various inputs.

The driving controller 3 and the driving unit 2 are connected to each other by three lines, i.e., a power supply voltage line (Vcc), a ground line (GND), and a PWM control signal PS2.

The driving controller 3 uses the PWM control signal PS2 to supply an initial signal and an engine start signal to the driving unit 2 and perform rotation speed control and on/off control of the active freewheel operation.

The transmitter 9 is a radio-controlled device for a moving body such as a drone or the like and transmits a signal (operation information) in response to an operation of an operator. The operation information is received by the receiver 8, and the operation contents of the operation information are recognized by the driving controller 3.

The receiver 8 and the driving controller 3 are connected by three lines, i.e., a power supply voltage line (Vcc), a ground line (GND), and a PWM control signal PS1 line.

The receiver 8 transmits, as a PWM control signal PS1, the operation information from the transmitter 9 to the driving controller 3.

The operator who uses the transmitter 9 can perform, e.g., an engine start operation, a throttle operation (throttle opening degree change), on/off control of an active freewheel operation, or the like.

The active freewheel operation is appropriately performed in the motor driving device 1 without an operator's awareness. The operator may recognize this operation in, e.g., a power-up mode. As will be described later, the active freewheel operation causes a load on the engine 5. Therefore, when the power-up is requested by the operator, the driving controller 3 can interpret this as a request to switch off the active freewheel operation.

The driving controller 3 that has acquired the operation information as the PWM control signal PS1 from the receiver 8 generates the PWM control signal PS2 in response to the operation information, and transmits the PWM control signal PS2 to the driving unit 2. Specifically, the operation information includes an engine start instruction, a throttle opening degree control instruction, an active freewheel operation on/off control instruction, or the like.

In the case of the throttle opening degree control instruction, a carburetor opening degree of the engine 5 is controlled by an engine driving system (not shown). At this time, the rotational speed (e.g., the number of revolutions) of the motor is also controlled.

Therefore, the driving controller 3 controls, for the driving unit 2, not only the supply of the engine start signal, the rotational speed control, and the active freewheel operation on/off control, but also the supply of the initial signal for the engine start, according to the operation information. These are realized by one PWM control signal PS2.

The driving controller 3 monitors a terminal voltage Vb (battery voltage) of the battery 6.

An engine rotation signal S1 (igniter signal) from the engine 5 is supplied to the driving controller 3. The engine rotation signal S1 is a Hall sensor signal, e.g., a signal of one pulse for one rotation of the engine. Before the engine 5 is started, the starter motor/generator 4 is rotated at, e.g., 500 rpm. After the engine 5 is started, the starter motor/generator 4 is rotated at about 2000 rpm. Therefore, the driving controller 3 can determine whether or not the engine 5 has been started based on the engine rotation signal S1, and can detect an increase in the load on the engine 5.

The driving controller 3 controls the driving unit 2 in response to the terminal voltage Vb of the battery 6 or the engine rotation signal S1, which is also realized by the PWM control signal PS2.

FIG. 2 shows an example of the PWM control signal PS2 outputted from the driving controller 3.

An H period of the PWM pulse is varied to control the rotation speed. For example, the rotation speed of the motor is controlled by varying the H period by a width of 1.3 ms to 2.0 ms.

For example, the transmitter 9 indicates the throttle information by a width of 0.8 ms to 2.0 ms of the H period. The minimum H period is 0.8 ms, and the maximum H period is 2.0 ms.

The driving controller 3 uses a period of a width of 1.3 ms to 2.0 for motor driving voltage control.

The initial signal is expressed by setting the H period of the PWM pulse to 0.8 ms, and the engine start signal is expressed by setting the H period of the PWM pulse to 1.2 ms. This is an example using a pulse length that does not correspond to the above-described length of 1.3 ms to 2.0 ms.

An L period of the PWM pulse is used for on/off control of the active freewheel operation. For example, when the L period is 4 ms, the active freewheel operation is off. When the L period is 2 ms, the active freewheel operation is on.

For example, as in the above-described example, the driving controller 3 transmits the control contents to the driving unit 2 using one PWM control signal PS2.

Figure 3:
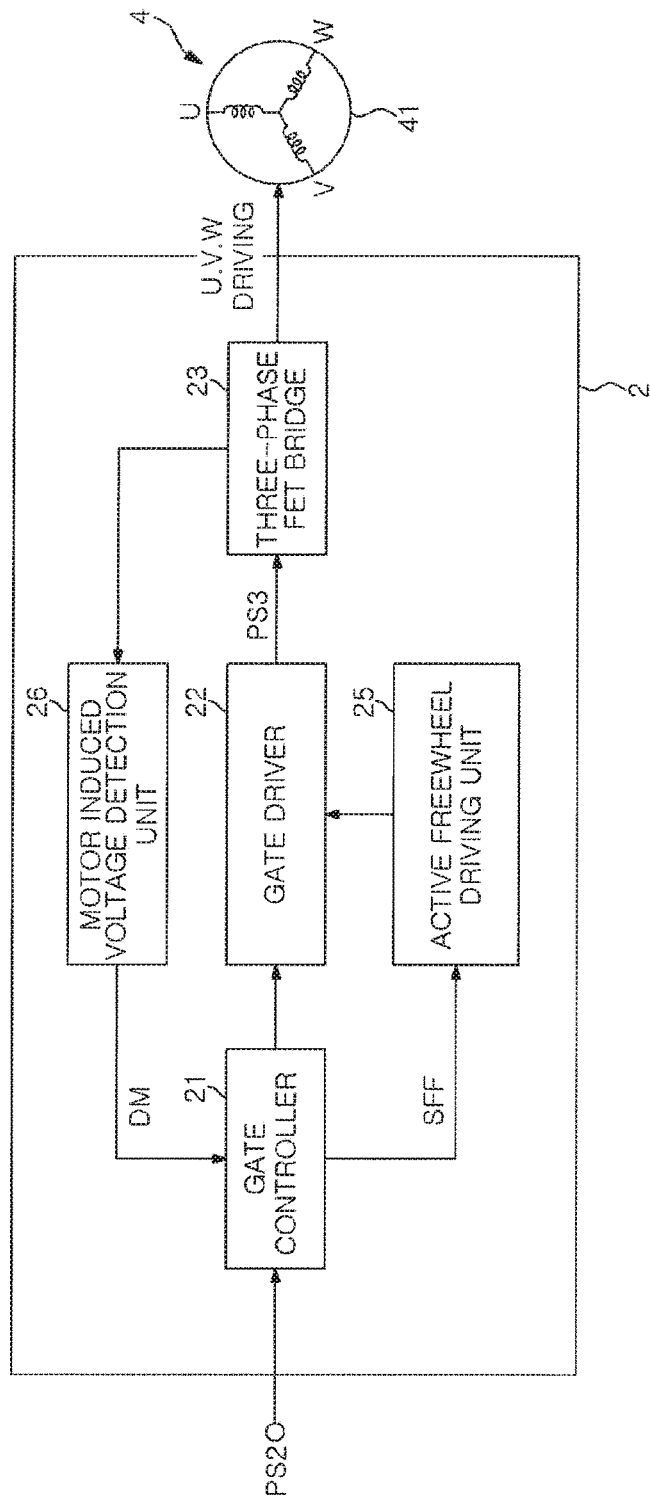
FIG. 3 is a block diagram of an internal configuration of a driving unit according to an embodiment.

FIG. 3 shows the configuration of the driving unit 2.

The driving unit 2 includes a gate controller 21, a gate driver 22, a three-phase FET bridge 23, an active freewheel driving unit 25, and a motor induced voltage detection unit 26.

The gate controller 21 includes a microcomputer, receives the PWM control signal PS2 from the driving controller 3, analyzes the instruction contents, and controls the gate driver 22 or the active freewheel driving unit 25.

Further, the gate controller 21 monitors magnet position data DM from the motor induced voltage detection unit 26, and sets a gate driving timing of switching elements of the three-phase FET bridge 23.

The gate driver 22 generates and outputs a gate driving signal PS3 for switching driving of each of FETs that are the switching elements of the three-phase FET bridge 23, based on the timing control of the gate controller 21.

The active freewheel driving unit 25 controls the gate driving signal PS3 from the gate driver 22 so that the active freewheel operation is on/off in response to an on/off setting signal SFF from the gate controller 21.

The three-phase FET bridge 23 generates motor driving currents for U phase, V phase, and W phase of the motor coil 41 of the starter motor/generator 4.

The motor induced voltage detector 26 detects the motor induced voltage from the three-phase FET bridge 23, generates the magnet position data DM, and supplies the magnet position data DM to the gate controller 21.

Figure 4:
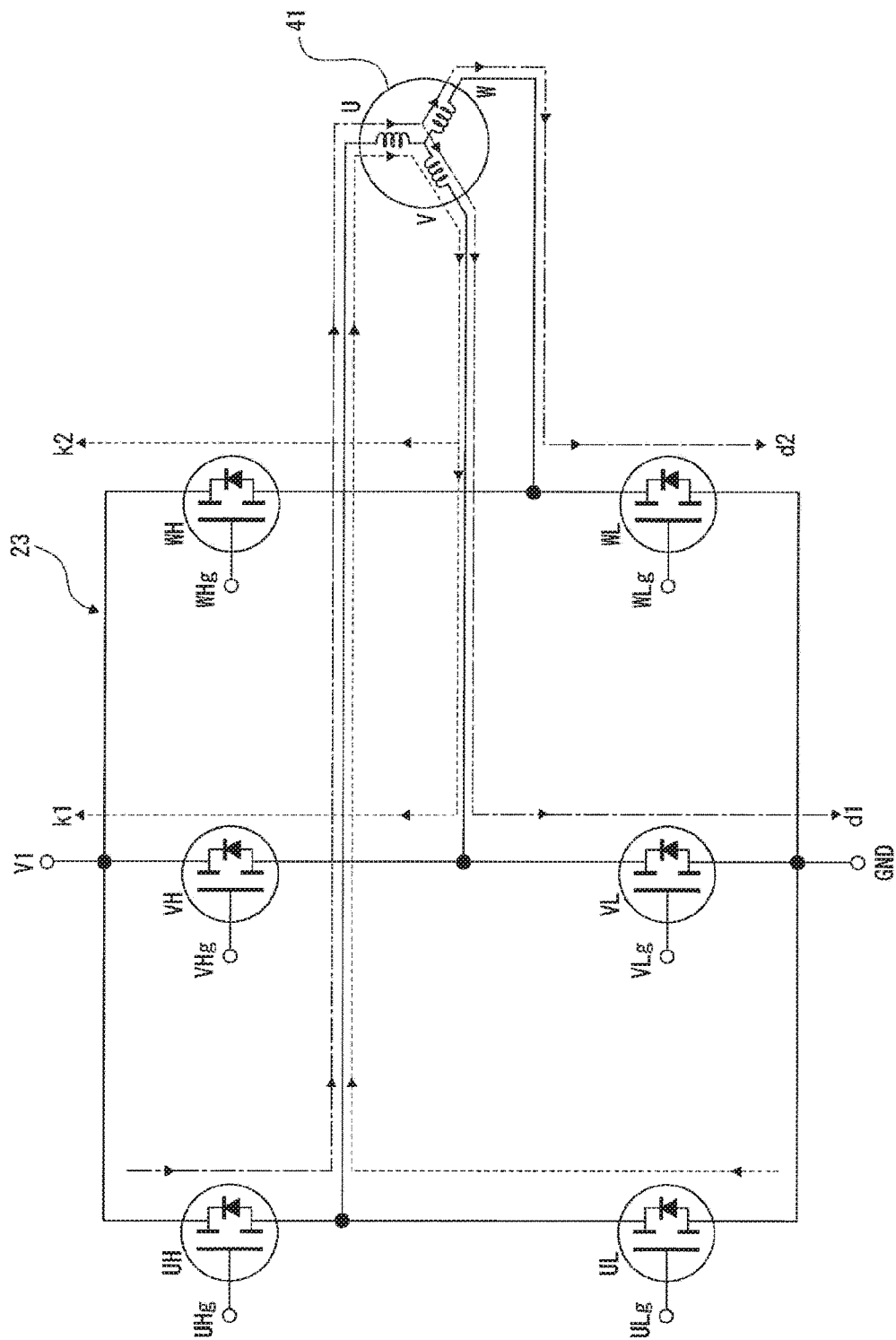
FIGS. 4 to 6 explain operations of a three-phase FET bridge according to an embodiment.
Figure 5:
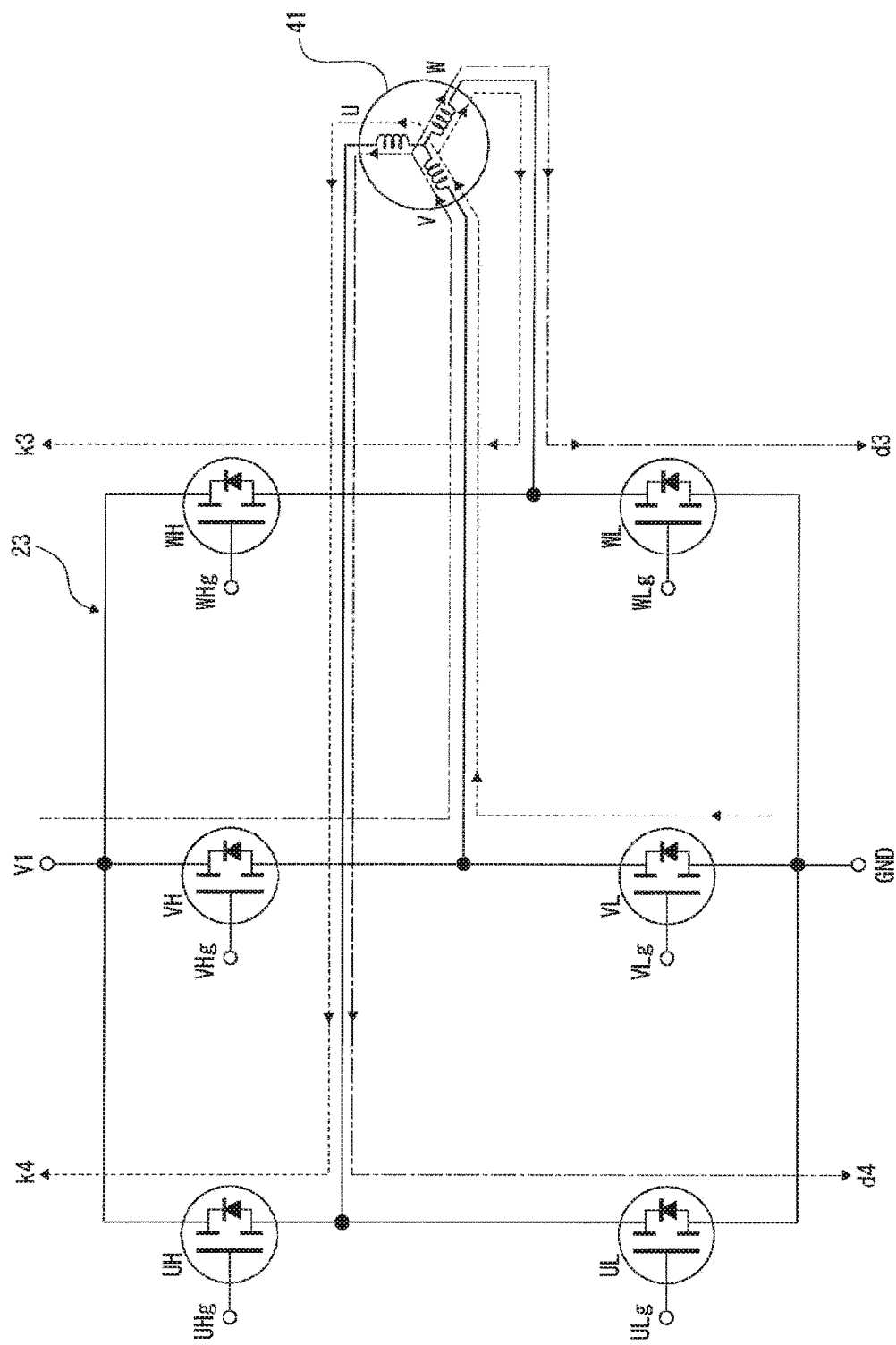
Figure 6:
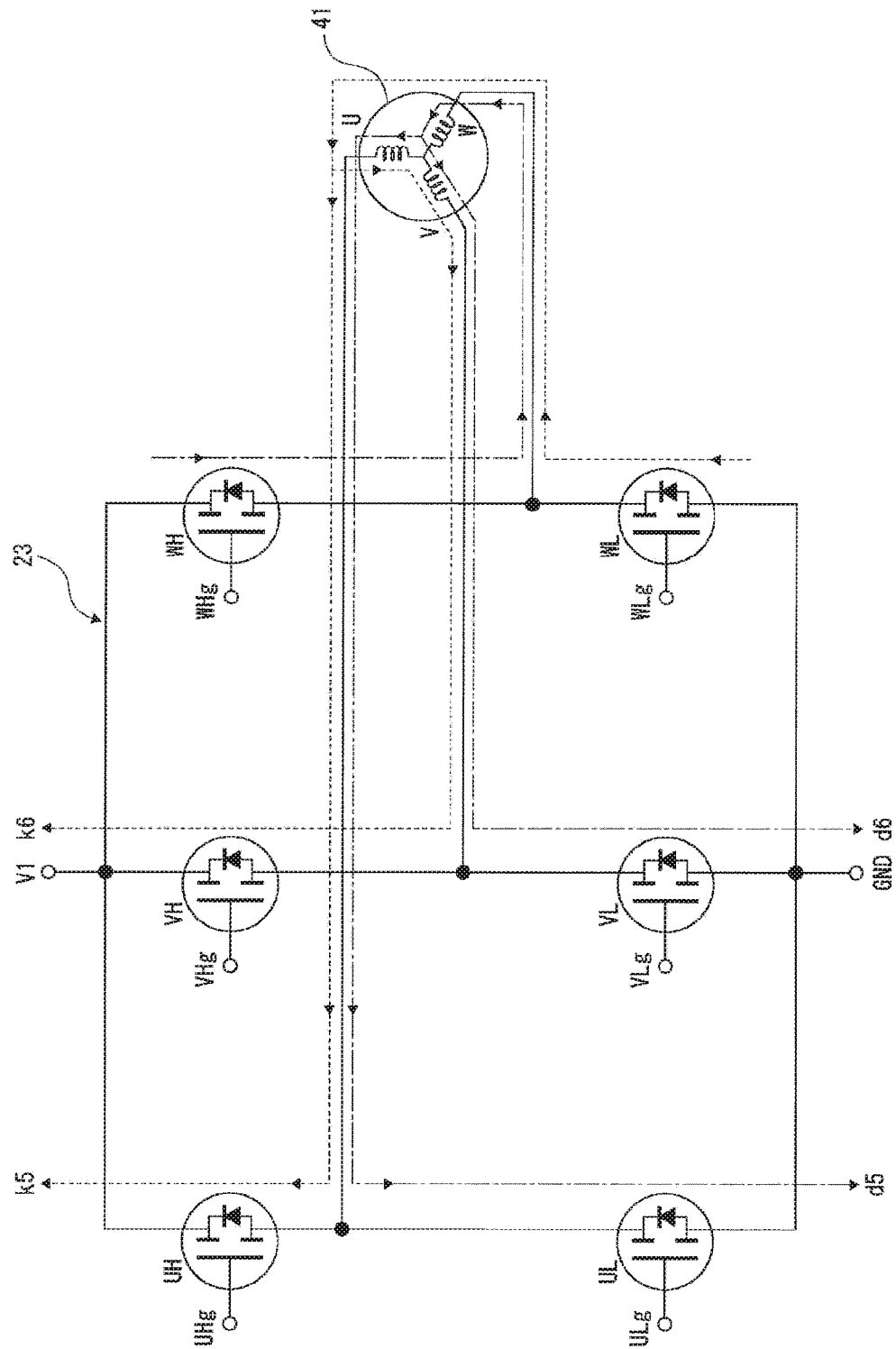

FIGS. 4 to 6 show the three-phase FET bridge 23 and the motor coil 41. Each of FIGS. 4 to 6 shows current paths in an ON timing period of the switching elements.

For example, as shown in FIG. 4, the three-phase FET bridge 23 is a bridge circuit using, e.g., six N-type MOS-FETs serving as switching elements between a voltage V1 and the ground.

In the case of the U phase, the switching elements UH and UL are connected in series, and the connection point is connected to the U phase coil of the motor coil 41.

In the case of the V phase, the switching elements VH and VL are connected in series, and the connection point is connected to the V phase coil of the motor coil 41.

In the case of the W phase, the switching elements WH and WL are connected in series, and the connection point is connected to the W phase coil of the motor coil 41.

Gate pulses UHg, ULg, VHg, VLg, WHg, and WLg from the gate driver 22 are applied to the gates of the switching elements UH, UL, VH, VL, WH, and WL, respectively. Accordingly, the switching elements VH, VL, WH, and WL are turned on/off.

The above-described gate driving signal PS3 collectively refers to these gate pulses UHg, ULg, VHg, VLg, WHg, and WLg.

FIG. 7 is a timing chart of the pate pulses of the gate driving signal PS3. One cycle operation is performed during periods t1 to t6. The pulse width, the number of pulses, and the like are schematically illustrated.

During the period t1 in FIG. 7, the H pulses PG appear intermittently in the gate pulses UHg and VLg, so that the switching elements UH and VL are intermittently turned on simultaneously. At this time, a motor driving current flows as indicated by a dash-dotted line d1 in FIG. 4.

During the period t2 in FIG. 7, the H pulses PG appear intermittently in the gate pulses UHg and WLg, so that the switching elements UH and WL are intermittently turned on simultaneously. At this time, a motor driving current flows as indicated by a dashed-dotted line d2 in FIG. 4.

During the period t3 in FIG. 7, the H pulses PG appear intermittently in the gate pulses VHg and WLg, so that the switching elements VH and WL are intermittently turned on simultaneously. At this time, a motor driving current flows as indicated by a dashed-dotted line d3 in FIG. 5.

During the period t4 in FIG. 7, the H pulses PG appear intermittently in the gate pulses VHg and ULg, so that the switching elements VH and UL are intermittently turned on simultaneously. At this time, a motor driving current flows as indicated by a dashed-dotted line d4 in FIG. 5.

During the period t5 of FIG. 7, the H pulses PG appear intermittently in the gate pulses WHg and ULg, so that the switching elements WH and UL are intermittently turned on simultaneously. At this time, a motor driving current flows as indicated by a dashed-dotted line d5 in FIG. 6.

During the period t6 in FIG. 7, the H pulses PG appear intermittently in the gate pulses WHg and VLg, so that the switching elements WH and VL are intermittently turned on simultaneously. At this time, a motor driving current flows as indicated by a dashed-dotted line d6 in FIG. 6.

The starter motor/generator 4 is rotated by the supply of the motor driving current, as described above.

Here, the motor driving voltage as an average voltage is changed depending on the H periods (or pulse duty) of the gate pulses UHg, ULg, VHg, VLg, WHg, and WLg as the gate driving signal PS3. The gate controller 21 can control the rotational speed of the motor by applying the motor driving voltage corresponding to, e.g., the operator's throttle opening degree control, the charging operation or the hybrid operation to be described later, by changing the H periods (or pulse duty) of the gate pulses UHg, ULg, VHg, VLg, WHg, and WLg in response to the rotational speed instructed by the PWM control signal PS2.

In the above description, the gate driving signal PS3 was used when the active freewheel operation is off. FIG. 8 shows the gate driving signal PS3 when the active freewheel operation is on.

In the periods t1 to t6 in FIG. 8, the H pulses PG forming the motor driving current paths (d1 to d6) have the same timings shown in FIG. 7. In addition, instantaneous H pulses PH appear as illustrated in FIG. 8.

During the period t1 in FIG. 8, the instantaneous H pulses PH appear intermittently as the gate pulses ULg and VHg within the L periods of the gate pulses UHg and VLg, so that the switching elements UL and VH are intermittently turned on simultaneously. At this time, the current caused by a counter electromotive voltage flows as indicated by a broken line k1 in FIG. 4.

During the period t2 in FIG. 8, the instantaneous H pulses PH appear intermittently as the gate pulses ULg and WHg within the L periods of the gate pulses UHg and WLg, so that the switching elements UL and WH are intermittently turned on simultaneously. At this time, the current caused by the counter electromotive voltage flows as indicated by a broken line k2 in FIG. 4.

During the period t3 in FIG. 8, the instantaneous H pulses PH appear intermittently as the gate pulses VLg and WHg within the L periods of the gate pulses VHg and WLg, so that the switching elements VL and WH are intermittently turned on simultaneously. At this time, the current caused by the counter electromotive voltage flows as indicated by a broken line k3 in FIG. 5.

During the period t4 in FIG. 8, the instantaneous H pulses PH appear intermittently as the gate pulses VLg and UHg within the L periods of the gate pulses VHg and ULg, so that the switching elements VL and UH are intermittently turned on simultaneously. At this time, the current caused by the counter electromotive voltage flows as indicated by a broken line k4 in FIG. 5.

During the period t5 in FIG. 8, the instantaneous H pulses PH appear intermittently as the gate pulses WLg and UHg within the L periods of the gate pulses WHg and ULg, so that the switching elements WL and UH are intermittently turned on simultaneously. At this time, the current caused by the counter electromotive voltage flows as indicated by a broken line k5 in FIG. 6.

During the period t6 in FIG. 8, the instantaneous H pulses PH appear intermittently as the gate pulses WLg and VHg within the L periods of the gate pulses WHg and VLg, so that the switching elements WL and VH are intermittently turned on simultaneously. At this time, the current caused by the counter electromotive voltage flows as indicated by a broken line k6 in FIG. 6.

In other words, in the active freewheel operation, the gate pulse ULg is turned on instantaneously when the chopping driving of the gate pulse UHg becomes an L level; the gate pulse VHg is turned on instantaneously when the chopping driving of the gate pulse VLg becomes an L level; and the gate pulse WHg is turned on instantaneously when the chopping driving of the gate pulse WLg becomes an L level.

Accordingly, the currents caused by the counter electromotive voltage flow through the switching elements and the boosting operation is performed.

Figure 9A:
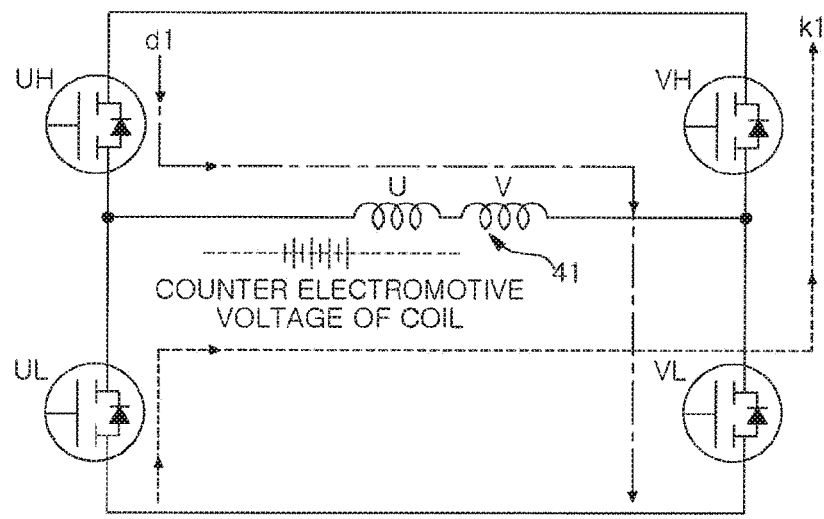
FIGS. 9A and 9B explain a counter electromotive force of a motor coil.

FIG. 9A shows the relationship between the motor driving current (dashed-dotted line d1) and the counter electromotive voltage in a single phase portion (operation during the period t1) of the motor driving circuit. The U phase and the V phase coils of the motor coil 41 and the switching elements UH, UL, VH, and VL are extracted.

Figure 9B:
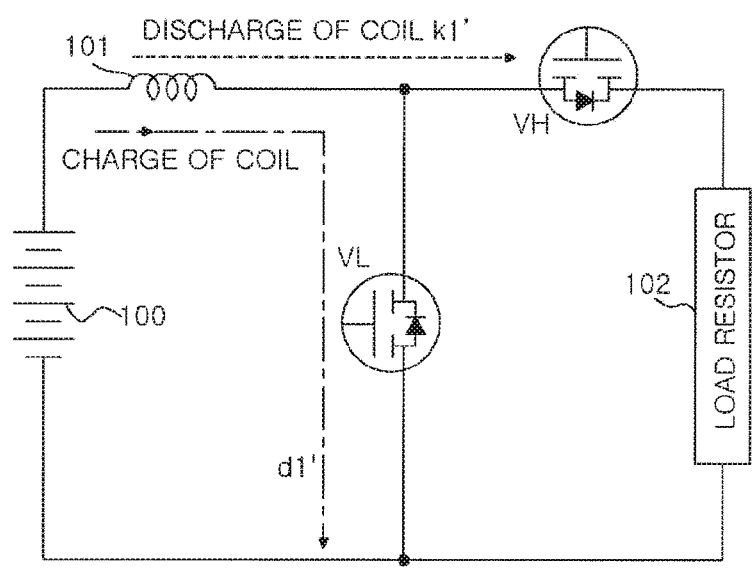

FIG. 9B shows a boosting circuit of a general DC/DC converter, which corresponds to FIG. 9A. The switching element VL corresponds to a switching element of the general DC/DC converter. The switching element VH corresponds to a diode of the general DC/DC converter. The coil 101 in FIG. 9B corresponds to the U-phase and V-phase coils of the motor coil 41 in FIG. 9A. In addition, a power supply 100 and a load resistor 102 are illustrated.

In FIG. 9A, a coil driving current flows by the FETs as the switching elements UH and VL. This current corresponds to the current that flows through the coil 101 and the switching element VL as indicated by a dashed-dotted line d1' by turning on the switching element VL in FIG. 9B.

In FIG. 9A, a discharge current (indicated by a dashed line k1) caused by the counter electromotive voltage flows by the FETs as the switching elements UL and VH. This current corresponds to the current that is discharged through the coil 101 and the switching element VH as indicated by a broken line k1' by turning on the switching element VH in FIG. 9B.

In brief, the active freewheel operation by the control described with reference to FIG. 8 enables the same boosting operation as that of the DC/DC converter.

In other words, due to the active freewheel operation, the regenerative voltage can be boosted and extracted.

Here, the control of the generated voltage will be described.

Figure 10:
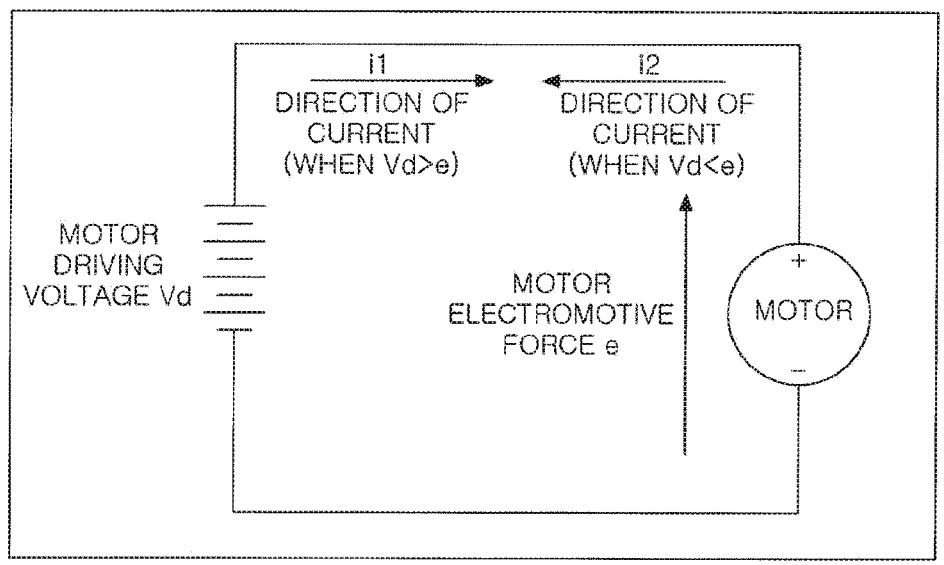
FIG. 10 explains a relationship between a rotational speed of a motor and a voltage.

FIG. 10 simply shows the relationship between the motor driving voltage Vd and the rotational speed of the motor. A motor electromotive force (motor electromotive voltage) e satisfies a condition "e=Ke×N." Ke indicates an electromotive force constant (Vd/rpm), and N indicates a rotational speed (rpm). The motor electromotive voltage is proportional to the rotational speed. A wiring resistance of the motor or the like is ignored.

In the case of Vd>e, the current flows into a positive terminal of the motor as indicated by an arrow i1, and the motor is accelerated.

In the case of Vd=e, the rotation of the motor is constant.

In the case of Vd<e, the current flows from the positive terminal of the motor as indicated by an arrow i2, and the motor serves as a generator (on the assumption that the motor is driven by an external force, e.g., the engine).

For example, when the motor is driven in a no-load state by a certain motor driving voltage Vd, the rotational speed of the motor becomes a rotational speed at which the motor driving voltage Vd equals to the motor electromotive voltage e.

If the motor driving voltage Vd is increased, the rotational speed of the motor is increased and stabilized at a level at which the motor driving voltage Vd equals to the motor electromotive voltage e.

In other words, the current flowing through the motor coil is determined by the difference between the motor driving voltage Vd and the motor electromotive voltage e.

The case where the motor is rotated by the external force (at a constant rotational speed) will be described.

(1) When the motor is rotated by the external force and the difference between the motor driving voltage Vd and the motor electromotive voltage e is small, a small amount of current flows through the motor coil (when a load is applied to the regenerative voltage) and the counter electromotive voltage is decreased.

(2) When the motor is rotated by the external force and the difference between the motor driving voltage Vd and the motor electromotive voltage e is large, a large amount of current flows through the motor coil (when a load is applied to the regenerative voltage) and the counter electromotive voltage is increased.

From the above (1) and (2), it is clear that when the motor is driven by the external force, the motor counter electromotive force voltage can be adjusted by changing the motor driving voltage Vd.

In the present embodiment, the regenerative voltage generated by the starter motor/generator 4 can be adjusted by controlling the motor driving voltage for the starter motor/generator 4. This indicates that the regenerative voltage can be adjusted by controlling the motor driving voltage as an average voltage, where in the motor driving voltage depends on the H periods (or pulse duty) of the gate pulses UHg, ULg, VHg, VLg, WHg, and WLg as the gate driving signal PS3 applied from the gate driver 22 to the three-phase FET bridge 23.

Furthermore, it can be considered that the motor driving voltage can be adjusted by the PWM control signal PS.

By increasing the counter electromotive voltage of the motor in the above-described active freewheel operation, a regenerative power with a sufficient voltage can be generated even when the rotational speed of the external force (i.e., the engine 5) for driving the starter motor/generator 4 is low.

In addition, when the active freewheel operation is off, the generated voltage of the motor becomes higher than or equal to a power supply voltage at a rotational speed higher than or equal to the no-load rotational speed of the power supply voltage. In this case, the voltage is controlled such that the rotational speed of the motor becomes equal to that of the engine, and it is difficult to perform precise control. On the other hand, when the active freewheel operation is on, the generated voltage can be increased even when the rotational speed of the motor is low and the generated voltage is low. Therefore, it is possible to precisely control the charging voltage by increasing the generated voltage to a voltage with a level at which charging can be performed.

Example of Processing of Driving Controller and Driving Unit

Figure 11A:
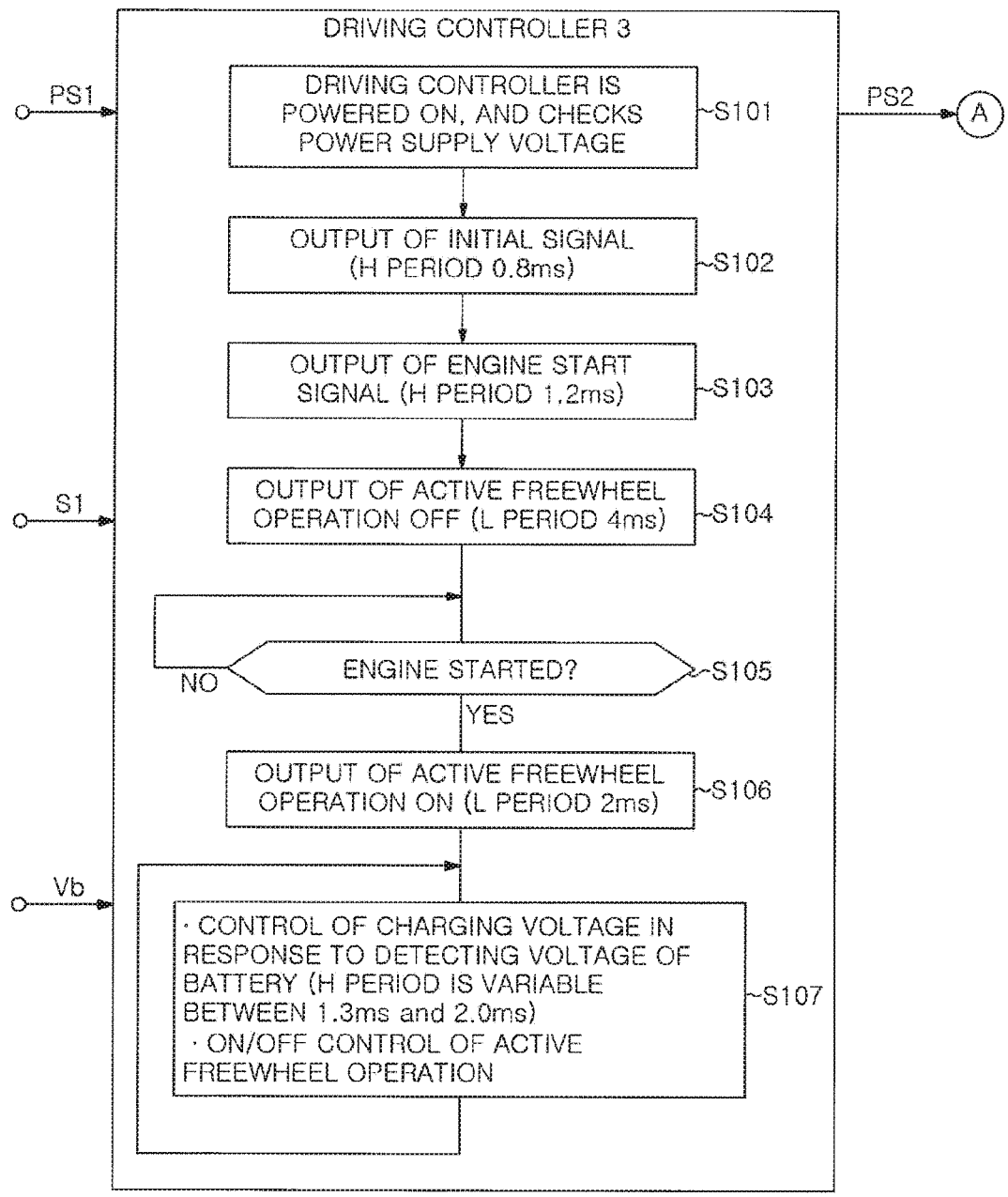
FIGS. 11A and 11B are flowcharts of processing of a driving controller and a driving unit according to an embodiment.
Figure 11B:
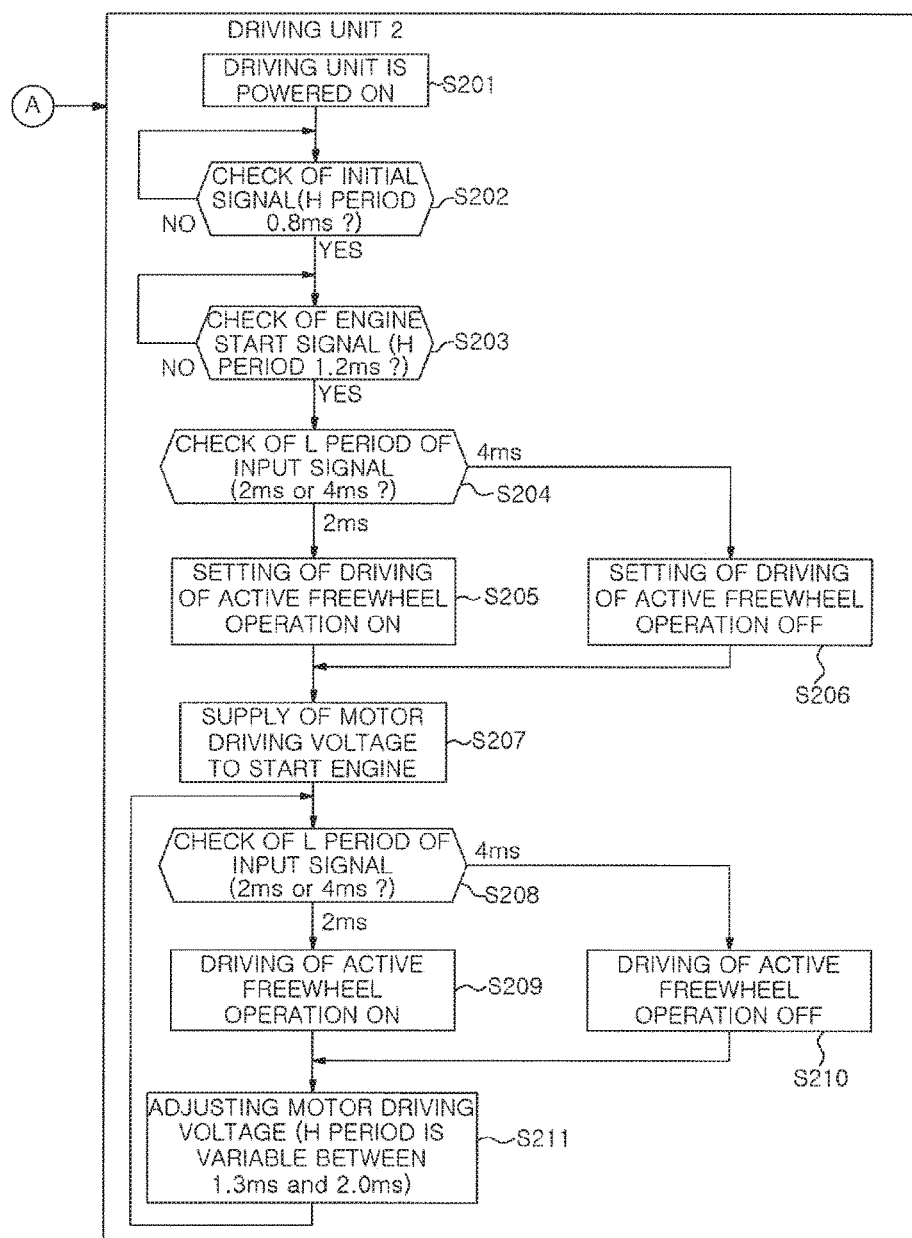

Based on the above-described configuration, a specific example of the processing of the driving controller 3 and the driving unit 2 will be described with reference to FIGS. 11A and 11B. As shown in FIG. 11A, the processing of the driving controller 3 includes steps S101 to S107, and, as shown in FIG. 11B, the processing of the gate controller 21 of the driving unit 2 includes steps S201 to S211.

As described above, the driving controller 3 receives the PWM control signal PS1 from the receiver 8, and the driving controller 3 monitors the engine rotation signal S1 or the terminal voltage Vb of the battery 6.

In step S101, a predetermined trigger is detected and the driving controller 3 is switched on. The driving controller 3 performs a power-on process and checks a power supply voltage.

When the power is on, in step S102, the driving controller 3 outputs an initial signal (see FIG. 2) using the PWM control signal PS2 for the driving unit 2.

Thereafter, in step S103, the driving controller 3 outputs an engine start signal (see FIG. 2) using the PWM control signal PS2.

In step S104, the driving controller 3 outputs an instruction to stop the active freewheel operation (see FIG. 2) using the PWM control signal PS2.

In step S201, the gate controller 21 of the driving unit 2 performs power-on processing in response to a predetermined trigger. Then, in step S202, the gate controller 21 checks the PWM control signal PS2 that is an input signal. In step S202, the gate controller 21 waits for an input of an initial signal. In other words, the gate controller 21 waits until the H period of the PWM control signal PS2 becomes 0.8 ms.

After the initial signal is checked, the gate controller 21 proceeds to step S203 and checks the engine start signal. In other words, the gate controller 21 waits until the H period of the PWM control signal PS2 that is an input signal becomes 1.2 ms.

After the engine start signal is checked, the gate controller 21 proceeds to step S204 and checks the active freewheel operation instruction by checking the L period of the PWM control signal PS2 that is the input signal.

If the L period is 2 ms, the gate controller 21 proceeds to step S205 in response to an instruction to start the active freewheel operation, and performs driving control to start the active freewheel operation (output of the gate driving signal PS3 shown in FIG. 8).

If the L period is 4 ms, the gate controller 21 proceeds to step S206 in response to an instruction to stop the active freewheel operation, and performs driving control to stop the active freewheel operation (output of the gate driving signal PS3 shown in FIG. 7).

In the example of FIGS. 11A and 11B, since the driving controller 3 issues, in step S104, an instruction to stop the active freewheel operation in the initial state, the process in step S206 is performed. However, the driving controller 3 may issue an instruction to start the active freewheel operation in the initial state.

In step S207, the gate controller 21 starts to output the gate driving signal PS3 and supplies a motor driving voltage to the starter motor/generator 4 to start the engine 5. In other words, the starter operation is performed.

Then, the gate controller 21 proceeds to step S208, and checks the instruction of the active freewheel operation by checking the L period of the PWM control signal PS2.

In step S105, the driving controller 3 waits for the start of the engine 5. In other words, the driving controller 3 monitors the engine rotation signal S1.

When it is confirmed from the engine rotation signal S1 that the engine 5 has been started, the driving controller 3 proceeds to step S106 and outputs an instruction to start the active freewheel operation using the PWM control signal PS2.

Thereafter, the driving controller 3 performs control in step S107. For example, the following processes Pa to process Pf are performed.

(Process Pa) control of the charging voltage (regenerative voltage) and on/off control of charging, in response to the terminal voltage Vb of the battery 6

(Process Pb) on/off control of the active freewheel operation in response to the terminal voltage Vb of the battery 6

(Process Pc) control of the motor driving voltage for assisting the engine, in response to the engine rotation signal S1

(Process Pd) on/off control of the active freewheel operation in response to the engine rotation signal S1

(Process Pe) control of the motor driving voltage in response to the PWM control signal PS1 from the receiver 8

(Process Pf) on/off control of the active freewheel operation in response to the PWM control signal PS1 from the receiver 8

The driving controller 3 outputs the PWM control signal PS2 in response to these processes.

The gate controller 21 of the driving unit 2 performs processes subsequent to step S208 in response to the PWM control signal PS2.

In other words, in step S208, the gate controller 21 checks the L period of the PWM control signal PS2, and checks the instruction of the active freewheel operation.

First, in response to the instruction from the driving controller 3 to start the active freewheel operation in step S106, after the engine is started in step S207, the gate controller 21 proceeds from step S208 to S209 quickly and performs the output control of the gate driving signal PS3 to start the active freewheel operation.

Thereafter, if there is an instruction to stop the active freewheel operation from the driving controller 3, the processing proceeds from step S208 to S210, and the gate controller 21 performs the output control of the gate driving signal PS3 to stop the active freewheel operation.

Next, the on/off of the active freewheel operation by the driving unit 2 is switched in response to the instruction from the driving controller 3.

In step S211, the gate controller 21 adjusts the motor driving voltage. At this time, the gate driving signal PS3 is variably controlled in response to the change in the H period of the PWM control signal PS2 between 1.3 ms and 2.0 ms. In other words, the motor driving voltage as the average voltage is controlled by varying the H periods of the gate pulses UHg, ULg, VHg, VLg, WHg, and WLg.

By repeating the processing of the driving controller 3 in step S107 and the processing of the gate controller 21 in steps S208 to S211, the adjustment of the motor driving voltage or the on/off control of the active freewheel operation are performed in the following manner in response to the circumstances or the operator's operation.

In the above process Pa, the driving controller 3 monitors the terminal voltage Vb of the battery 6 to charge the battery 6 using the regenerative current, and variably controls the motor driving voltage by adjusting the H period of the PWM control signal PS2 within a range of 1.3 ms to 2.0 ms to obtain a desired regenerative voltage. The motor driving voltage is controlled such that the charging operation is stopped when the battery 6 is fully charged.

In the above process Pb, the driving controller 3 controls the active freewheel operation to be stopped when the terminal voltage Vb of the battery 6 becomes higher than or equal to a reference voltage. This is because when the charging is not performed, there is no need to perform the active freewheel operation to increase the regenerative voltage.

In the above process Pc, when the load on the engine 5 is increased and the rotational speed of the engine is decreased, the motor driving voltage is controlled such that the engine assist operation of the starter motor/generator 4 is performed.

The engine assist operation (hybrid operation) will be described later.

In the above process Pd, the driving controller 3 stops the active freewheel operation when the rotational speed of the engine become lower than a certain limit. The active freewheel operation increases the load on the engine 5 (such as applying the brake on the engine). Therefore, if the rotational speed of the engine is decreased, the engine may be stopped. Accordingly, the monitored rotational speed of the engine is monitored, and when the monitored rotational speed of the engine is lower than a certain limit, the active freewheel operation is stopped and the charging operation is stopped.

The rotation speed limit is determined in consideration of torque characteristics and a charging current of the engine 5 and an environment where the engine 5 is used.

In the above process Pe, the motor driving voltage is varied in response to the operator's throttle operation. The rotational speed of the starter motor/generator 4 is controlled by setting the H period of the PWM control signal PS2 to be within a range of 1.3 ms to 2.0 ms and variably controlling the motor driving voltage within this range.

In the above process Pf, when the power is required, the operator stops the active freewheel operation. For example, when the operator performs an operation such as a power-up mode or the like, the driving controller 3 stops the active freewheel operation.

For example, in the processing of FIGS. 11A and 11B, when the engine 5 is started, the driving controller 3 basically starts the active freewheel operation to charge the battery. At this time, a part of the engine power is used for the charging operation. The operator performs the operation of the power-up mode, if necessary. In this case, the driving controller 3 stops the active freewheel operation because the power-up is more important than the charging.

<Hybrid Operation>

Hereinafter, the hybrid operation will be described. Here, the hybrid operation indicates an operation in which the starter motor/generator 4 assists the engine 5.

In other words, when the rotational speed of the engine is lower than a certain value related to the throttle position due to a load or the like, the starter motor/generator 4 automatically assists the engine 5 with a torque that is proportional to the decreased rotational speed.

First, the device setting will be described. In the following description of the hybrid operation, the starter motor/generator 4 is simply referred to as "motor 4."

When the carburetor is fully opened (position a in FIG. 12), if the rotational speed at which the motor 4 starts to assist the engine 5 is set to Ra and the voltage applied to the motor 4 is set to Va, it is required to select the motor 4 having a KV value (rotational speed per 1V) k that satisfies a condition k=Ra/Va. Therefore, it is assumed that it is required to select the motor 4 having the rotational speed Ra at the voltage Va. In other words, the rotational speed Ra indicates the rotational speed at which the motor 4 does not generate a torque to the outside.

The carburetor opening degree, the input signal to the driving unit 2 (PWM control signal PS2), and the motor driving voltage are linked to one another.

Figure 12:
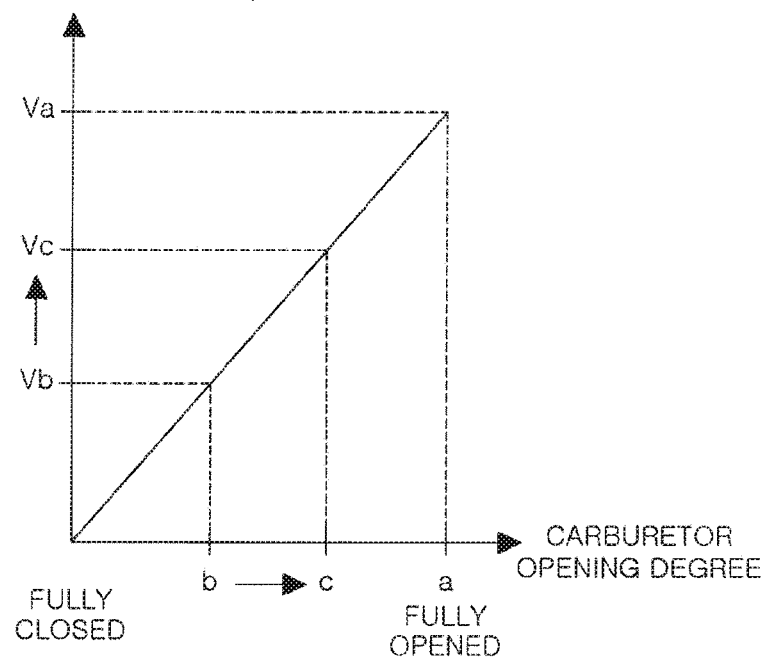
FIG. 12 explains device setting according to an embodiment.

For example, linear interpolation is performed between the fully open position a and the position in which the carburetor is fully closed and the voltage V0 applied to the motor 4 is set to 0 (V), the carburetor opening degree and the voltage applied to the motor 4 have the relationship shown in FIG. 12.

The operation in the case where the load is increased will be explained based on the above-described assumption.

First, it is assumed that the carburetor opening degree in the operation state before the load increase in FIG. 12 is b; the voltage applied to the motor 4 is Vb; and the rotational speed Rb satisfies a condition Rb=k*Vb.

Figure 13:
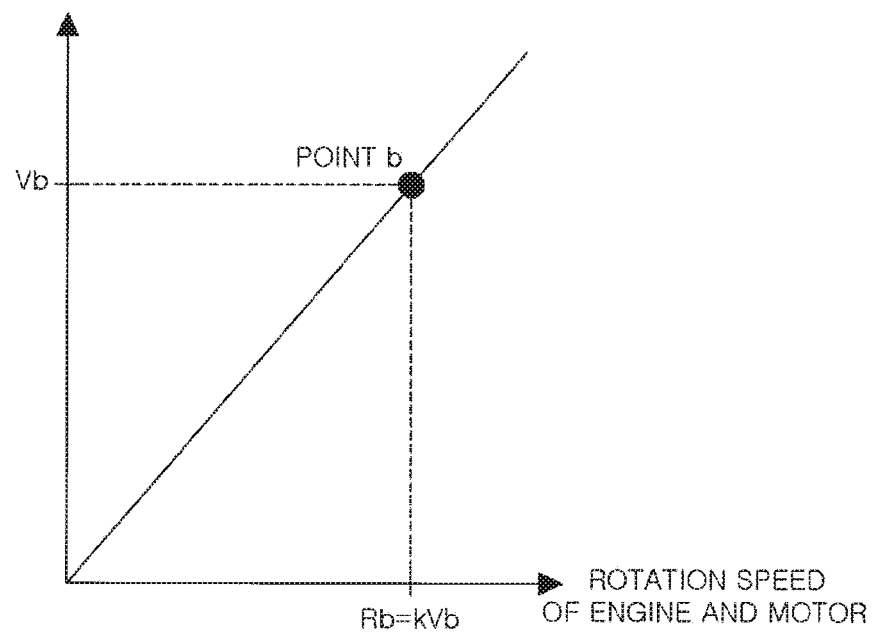
FIG. 13 explains the case where a load is increased according to an embodiment.

The operation state is at a point b in FIG. 13, and the power generation amount and the torque for assisting the engine 5 are zero.

A first case of the load increase will be described.

Figure 14:
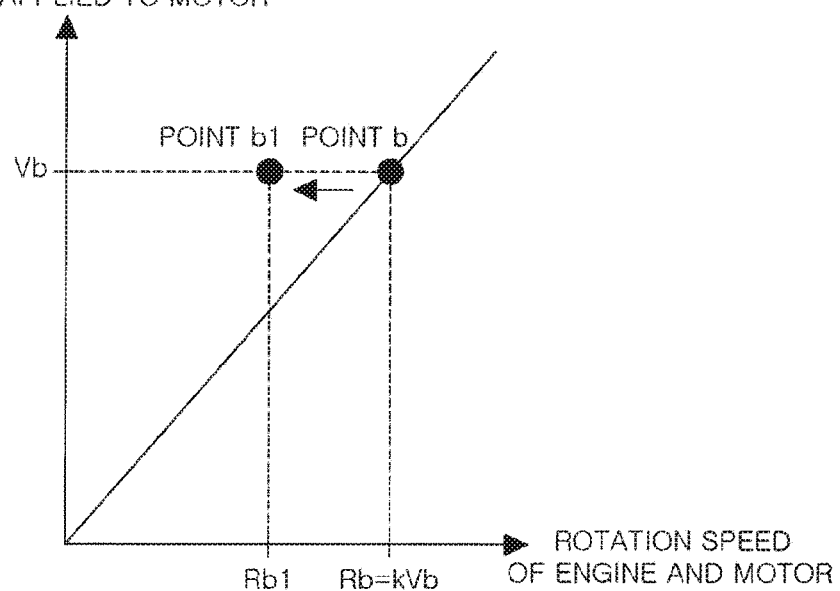
FIG. 14 explains the case where a rotational speed of an engine is decreased according to an embodiment.

When the load is increased and the rotational speed of the engine 5 is decreased to "Rb1" in FIG. 14, the operation state moves to a point b1.

The voltage Vb applied to the motor 4 is not changed. Since, however, the motor 4 and the engine 5 are connected to each other, the rotational speed is decreased by ΔR=(Rb−Rb1) and the torque generated by the motor 4 is increased, thereby assisting the engine 50.

A second case of the load increase will be described. This is performed when the operator operates (opens) the throttle.

Figure 15:
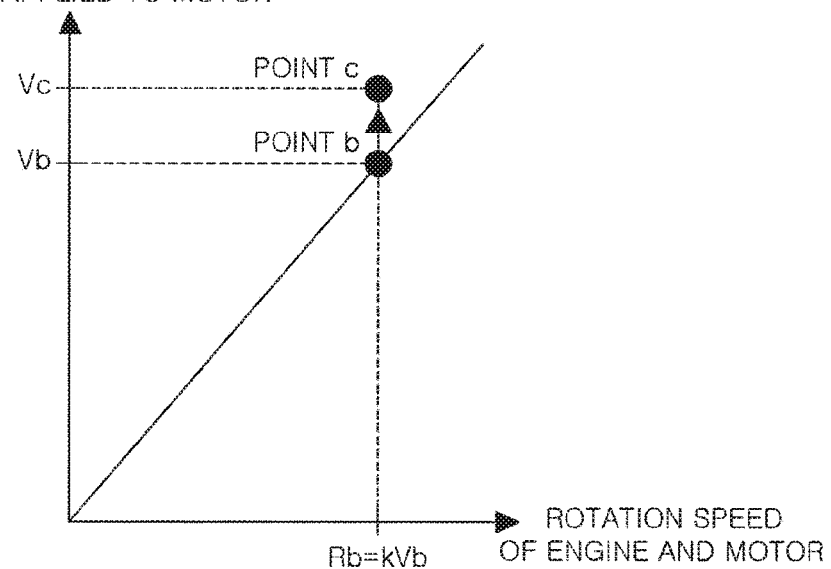
FIG. 15 explains the case where a throttle is opened according to an embodiment.

In FIG. 12, when the carburetor opening degree is set to "c" by opening the throttle in a state where a carburetor opening degree b, a voltage Vb applied to the motor 4, and a rotational speed Rb satisfy a condition Rb=k*Vb, the voltage applied to the motor 4 becomes "Vc" and the operation state moves from point b to a point c in FIG. 15.

Since the applied voltage is increased without changes in the rotational speed, the torque generated by the motor 4 is increased, thereby assisting the engine 5.

Figure 16:
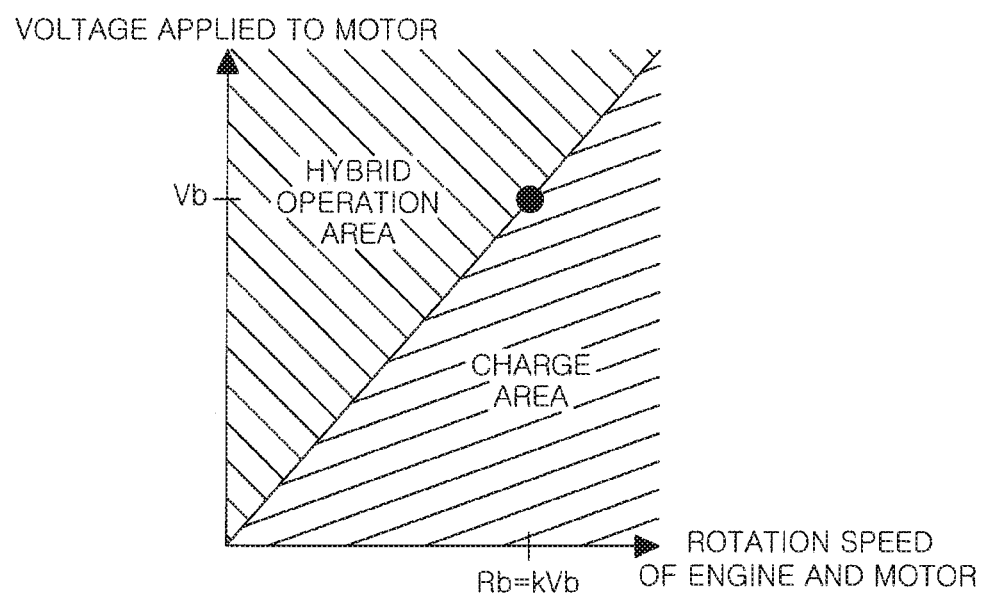
FIG. 16 explains a hybrid operation area and a charging area according to an embodiment

In the present embodiment, whether the operation will be performed in "hybrid operation area" or in "charge area" shown in FIG. 16 is determined by the relationship between "rotation speed of the engine (=rotational speed of the motor)" and "motor driving voltage."

If the operation is performed on a diagonal line in FIG. 16, the charging is not performed and the engine is not assisted.

If the rotational speed of the engine is decreased in a state where the motor driving voltage is constant, the operation is performed in the hybrid operation area (example of the first case).

If the motor driving voltage becomes higher than the voltage corresponding to the rotational speed of the engine, the operation is performed in the hybrid operation area (example of the second case).

On the other hand, in the charging area, the charging by the regenerative power is performed.

In the present embodiment, the switching between the operation in the hybrid operation area and that in the charging area is not particularly controlled.

The driving controller 3 basically turns on the active freewheel operation, basically operates in the charging area, and automatically moves to the hybrid area depending on the circumstances. In other words, in the above process Pc, the rotational speed of the engine is monitored, and the control of the movement to the hybrid operation area is performed, if necessary.

In the above process Pd, the active freewheel operation increases the load on the engine 5 (applying the brake on the engine). Therefore, when it is difficult for the engine 5 to operate, the active freewheel operation is controlled to be stopped.

SUMMARY

In the above-described embodiment, the motor driving device 1 includes the driving unit 2 for driving the starter motor/generator 4 that is directly connected to the engine 5 by the rotational shaft by way of performing the on/off control of the switching elements in the bridge circuit (three-phase FET bridge 23) for driving the motor, and the driving controller 3 for controlling the driving of the starter motor/generator 4 by the driving unit 2.

The driving unit 2 controls the motor driving voltage for the starter motor/generator 4 by changing the ON periods of the switching elements of the three-phase FET bridge 23. Further, as shown in FIG. 8, the driving unit 2 performs the active freewheel operation for boosting the regenerative voltage using the starter motor/generator 4 by turning on a predetermined switching element of the three-phase FET bridge 23 at a predetermined timing of the H pulse PH. The driving controller 3 can, for the driving unit 2, issue the motor driving voltage instruction and the on/off instruction of the active freewheel operation based on the battery voltage (terminal voltage Vb of the battery 6).

In accordance with this motor driving device 1, it is possible to appropriately control one motor (starter motor/generator 4) serving as a starter motor and a motor for generating a charging power. In other words, the operation of the motor that serves as the starter and assists the engine, and the operation of generating power for charging the battery 6 are automatically switched.

Therefore, the engine assistance operation and the charging operation can be appropriately performed without awareness of a user, e.g., an operator using a transmitter 9. Particularly, the driving controller 3 controls the driving unit 2 by monitoring the terminal voltage Vb of the battery 6 and issuing the motor driving voltage instruction and the on/off instruction of the active freewheel operation. Accordingly, the engine assistance operation and the charging operation are appropriately performed (see S107 and S208 to S211 in FIG. 11B).

In the motor driving device 1, the motor driving voltage is controlled by the gate on/off control of the switching elements UH, UL, VH, VL, WH, and WL of the three-phase FET bridge 23, and the active freewheel operation is performed.

Therefore, it is possible to control the motor driving voltage and the regenerative voltage, and perform the boosting operation using the active freewheel operation, or the like without additionally requiring a step-up/step-down circuit, a motor speed increasing mechanism, or the like. In other words, the engine assistance operation and the charging operation can be efficiently performed without increasing a circuit scale.

More specifically, conventionally, a starter driving control device and a power generation regulating rectifier were separately required. Therefore, a load was heavy in the case of installation on a small mobile engine.

The motor driving device 1 of the present embodiment can reduce the weight by sharing the power generation regulating rectifier with the starter driving control device.

Further, the engine 5 and the starter motor/generator 4 are directly connected, so that a starter mechanism or a driving unit for power generation is not required.

A permanent magnet generator generates a generated voltage in response to a rotational speed of an engine. Therefore, conventionally, a semiconductor control element having a high withstand voltage was used. Further, when a rotational speed was low, the speed increase was required to ensure a charging voltage.

In accordance with the motor driving device 1 of the present embodiment, the generated voltage of the permanent magnet generator can be controlled. Therefore, the generated voltage can be decreased when the generated voltage is high, and can be increased when the generated voltage is low. Accordingly, the voltage suitable for charging the battery 6 can be obtained in a wide range of the rotational speed, and it is not required to increase the speed of the generator or the semiconductor element having a high withstand voltage.

Due to the active freewheel operation, a relatively high regenerative voltage can be obtained even at a low rotation speed, which makes it possible to efficiently perform the charging operation.

By performing active freewheel operation, a regenerative current path through a body diode of an FET that is a switching element is not used. Therefore, there is advantageous that the efficiency or the accuracy does not deteriorate, compared to the case of using the body diode.

In the embodiment, the driving controller 3 controls the driving unit 2 by issuing the motor driving voltage instruction and the active freewheel operation instruction using the PWM control signal PS2 that is one PWM signal.

In other words, in the above example, the motor driving voltage was controlled by setting the H period of the PWM control signal PS2 to 1.3 ms to 2.0 ms, and the on/off of the active freewheel operation was controlled by setting the L period to 2 ms or 4 ms. Accordingly, the engine assistance operation and the charging operation can be appropriately performed using one PWM signal. In other words, as in the conventional motor driving device, the control can be performed using one PWM signal.

The specific period, the control contents, and the like shown in FIG. 2 are merely examples.

In the embodiment, the driving controller 3 controls the driving unit 2 by supplying the initial signal and start the engine using the PWM control signal PS2 that is one PWM signal.

The initial signal or the engine start signal is set by the H period of the PWM control signal PS2. Accordingly, the driving controller 3 performs overall control for the driving unit 2 using one PWM signal. The connection line simply includes three lines, i.e., a power line, a ground line, and a PWM signal line.

In the embodiment, the driving controller 3 can perform the on/off control of the active freewheel operation in response to the engine rotation signal S1 or the operation information (PWM control signal PS1 from the receiver 8).

For example, when the rotational speed of the engine is decreased, it is possible to stop the active freewheel operation, or it is possible to stop the active freewheel operation in response to a user's operation.

Accordingly, it is possible to determine priority between the charging operation and the engine assistance operation. When power is required for driving a drone or the like, the active freewheel operation can be stopped to reduce the load on the engine. In this manner, the priority can be determined depending on the circumstances.

The invention claimed is:

1. A motor driving device comprising:
a driving unit configured to drive a starter motor/generator that is directly connected to an engine by a rotation shaft, by performing on/off control of each of switching elements in a bridge circuit for driving the starter motor/generator; and
a driving controller configured to control a driving operation for the starter motor/generator that is performed by the driving unit,
wherein the driving unit controls a motor driving voltage for the starter motor/generator by changing ON periods of the switching elements of the bridge circuit, and turns on predetermined switching elements of the bridge circuit at a predetermined timing to perform an active freewheel operation for boosting a regenerative voltage generated by the starter motor/generator, and
the driving controller is configured to instruct the driving unit to control the motor driving voltage and on/off of the active freewheel operation, based on a battery voltage of a battery configured to be charged based on the regenerative voltage.

2. The motor driving device of claim 1, wherein the driving controller is configured to instruct the driving unit to control the motor driving voltage and the on/off of the active freewheel operation, by using one PWM signal.

3. The motor driving device of claim 2, wherein the driving controller is configured to provide the driving unit with an initial signal and an engine start signal, by using the one PWM signal.

4. The motor driving device of claim 3, wherein the driving controller is configured to instruct the driving unit to perform on/off control of the active freewheel operation, in response to engine rotation information or operation information.

5. The motor driving device of claim 2, wherein the driving controller is configured to instruct the driving unit to perform on/off control of the active freewheel operation, in response to engine rotation information or operation information.

6. The motor driving device of claim 1, wherein the driving controller is configured to instruct the driving unit to perform on/off control of the active freewheel operation, in response to engine rotation information or operation information.

* * * * *